United States Patent [19]

Turnquist et al.

[11] Patent Number: 5,416,137
[45] Date of Patent: May 16, 1995

[54] CATHODIC ELECTROCOATING COMPOSITIONS HAVING IMPROVED THROW POWER, CONTAINING MULTIFUNCTIONAL PHENOLS

[75] Inventors: Lee A. Turnquist, Roseville; Peter W. Uhlianuk, Romeo; Ding Y. Chung, Rochester Hills, all of Mich.

[73] Assignee: E. I. Du Pont de Nemours and Company, Wilmington, Del.

[21] Appl. No.: 252,468

[22] Filed: Jun. 1, 1994

[51] Int. Cl.$^6$ ............................................. C08L 63/00
[52] U.S. Cl. ................................... 523/415; 528/104; 427/386; 204/181.7
[58] Field of Search ...................... 523/415; 528/104; 427/386; 204/181.7

[56] References Cited

U.S. PATENT DOCUMENTS

| | | | |
|---|---|---|---|
| 3,952,023 | 4/1976 | Kaiya et al. | 260/346.8 R |
| 3,984,299 | 10/1976 | Jerabek | 523/415 |
| 4,145,501 | 3/1979 | Kaiya et al. | 526/217 |
| 4,241,101 | 12/1980 | Saunders et al. | 427/32 |
| 4,256,621 | 3/1981 | Shimokai et al. | 260/29.7 NR |
| 4,340,716 | 7/1982 | Hata et al. | 528/104 |
| 4,560,732 | 12/1985 | Kojo et al. | 528/104 |
| 5,089,542 | 2/1992 | Nishida et al. | 523/410 |
| 5,147,906 | 9/1992 | Nishida et al. | 523/410 |
| 5,158,995 | 10/1992 | Nishida et al. | 523/410 |

FOREIGN PATENT DOCUMENTS 2001700  5/1990  Canada.
2055843  3/1981  United Kingdom.

*Primary Examiner*—Frederick Krass
*Attorney, Agent, or Firm*—Hilmar L. Fricke

[57] ABSTRACT

An improved aqueous cathodic electrocoating composition having a binder of an epoxy resin-amine adduct which is an epoxy resin that has been reacted with an amine, and a blocked polyisocyanate crosslinking agent; wherein the improvement is the use of a multihydric phenol i.e., a phenol having more than two reactive hydroxyl groups along with a dihydric phenol to form the epoxy resin used in the electrocoating composition to provide a composition having improved throw power.

7 Claims, No Drawings

CATHODIC ELECTROCOATING COMPOSITIONS HAVING IMPROVED THROW POWER, CONTAINING MULTIFUNCTIONAL PHENOLS

BACKGROUND OF THE INVENTION

This invention is directed to a cathodic electrocoating composition and in particular to a cathodic electrocoating composition having improved throw power.

The coating of electrically conductive substrates by an electrodeposition process also called an electrocoating process is a well known and important industrial process. Electrodeposition of primers to automotive substrates is widely used in the automotive industry. In this process, a conductive article, such as an autobody or an auto part, is immersed in a bath of a coating composition of an aqueous emulsion of film forming polymer and acts as an electrode in the electrodeposition process. An electric current is passed between the article and a counter-electrode in electrical contact with the aqueous emulsion, until a desired coating is deposited on the article. In a cathodic electrocoating process, the article to be coated is the cathode and the counter-electrode is the anode.

Resin compositions used in the bath of a typical cathodic electrodeposition process also are well known in the art. These resins typically are made from polyepoxide resins which have been chain extended and then an adduct is formed to include amine groups in the resin. Amine groups typically are introduced through reaction of the resin with an amine compound. These resins are blended with a crosslinking agent and then neutralized with an acid to form a water emulsion which is usually referred to as a principal emulsion.

The principal emulsion is combined with a pigment paste, coalescent solvents, water, and other additives to form the electrocoating bath. The electrocoating bath is placed in an insulated tank containing the anode. The article to be coated is the cathode and is passed through the tank containing the electrodeposition bath. The thickness of the coating that is deposited on the article being electrocoated is a function of the bath characteristics, the electrical operating characteristics, the immersion time, and the like.

The resulting coated article is removed from the bath after a set period of time and is rinsed with deionized water. The coating on the article is cured typically in an oven at sufficient temperature to produce a crosslinked finish on the article.

Cathodic electrocoating compositions, resin compositions, coating baths and cathodic electrodeposition processes are disclosed in Jarabek et al U.S. Pat. No. 3,922,253 issued Nov. 25, 1975; Wismer et al U.S. Pat. No. 4,419,467 issued Dec. 6, 1983; Belanger U.S. Pat. No. 4,137,140 issued Jan. 30, 1979 and Wismer et al U.S. Pat. No. 4,468,307 issued Aug. 25, 1984.

Throw power of electrocoating compositions continues to be a problem. Throw power is the degree to which an electrodeposited film penetrates and coats the surfaces of recessed interior areas of an automobile or truck body. Electrodeposition of coatings follows the force lines of the electrical field that exists in an electrocoating bath between the cathode and the anode. These force lines diminish as they penetrate into the recessed areas of the auto or truck body and cease to exist when the recessed area is too deep and a coating will not be deposited into such an area.

As automobile and truck body designs change, there is an increased need for electrocoating composition that have increased throw power and that will penetrate and coat recessed areas. The improved composition of this invention has increased throwing power along with other desirable characteristics of solvent, corrosion and chip resistance.

SUMMARY OF THE INVENTION

An improved aqueous cathodic electrocoating composition having a binder of an epoxy-amine adduct which is of an epoxy resin that has been reacted with an amine, and a blocked polyisocyanate crosslinking agent; wherein the improvement is the use of a multihydric phenol i.e., a phenol having more than two reactive hydroxyl groups along with a dihydric phenol to form the epoxy resin used in the electrocoating composition to provide a composition having improved throw power.

DETAILED DESCRIPTION OF THE INVENTION

The film forming binder of the principal emulsion used to form the cathodic electrocoating composition is an epoxy amine adduct and a blocked polyisocyanate crosslinking agent. The epoxy amine adduct is formed of an epoxy resin which preferably is chain extended and then reacted with an amine.

The epoxy resin is an epoxy terminated polyepoxy hydroxy ether resins having a 1,2-epoxy equivalency of about two or more, that is, polyepoxides which have on an average basis two or more epoxy groups per molecule. The preferred polyepoxides are polyglycidyl ethers of cyclic polyols. Particularly preferred are polyglycidyl ethers of dihydric phenols such as bisphenol A. These polyepoxides are produced by etherification of dihydric phenols with epihalohydrin or dihalohydrin such as epichlorohydrin or dichlorohydrin in the presence of alkali. Examples of dihydric phenols are 2,2-bis-(4-hydroxyphenyl)ethane; 2-methyl-1,1-bis-(4-hydroxyphenyl) propane; 2,2-bis-(4-hydroxy-3-tertiarybutylphenyl)propane; 1,1-bis-(4-hydroxyphenol)ethane; bis-(2-hydroxynaphthyl)methane; 1,5-dihydroxy-3-naphthalene or the like.

Surprisingly and unexpectedly, when a small amount of a multihydric phenol is used in combination with the dihydric phenol to form the epoxy resin, electrocoating compositions are formed that have significantly improved throw power and the electrocoating composition which is an emulsion in water shows improved stability over conventional compositions made without the multihydric phenol. By multihydric phenol as used herein is meant phenols that have more than two reactive hydroxyl groups. Typically, the molar ratio of multihydric phenol to dihydric phenol can range from about 0.005/1 to about 1/1. Preferably, molar ratio is about 0.02/1 to about 0.2/1.

Typically useful multihydric phenols have the general formula

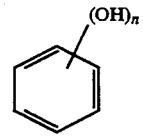

wherein n is 3–5.

Examples of such multihydric phenols are pyrogallol (1,2,3-trihydroxybenzene), phloroglucinol (1,3,5 trihydroxybenzene) and 1,2,4,5 tetrahydroxy benzene. These epoxy resins have molecular weights of at least 200 and preferably within the range of 200 to 3000, and more preferably about 340 to 2000.

The epoxy resins can be chain extended with a dihydric phenol, a polyether or a polyester polyol which enhances flow and coalescence of a coating that is electrodeposited on a substrate. The use of a multihydric phenol with these chain extenders surprisingly improves the throw power of an electrocoating composition formed from such a chain extended resin. The molar ratio of multihydric phenol to chain extender is in the same range as above.

A conventional epoxy resin that has been formed with a dihydric phenol can be chain extended with one of the aforementioned chain extenders and a multihydric phenol and the resulting resin will exhibit improved throw power. The molar ratio of multihydric phenol to chain extender is the same range as shown above.

Typically useful chain extenders are the aforementioned dihydric phenols and polyols such as polycaprolactone diols such as Tone 200 ® series available from Union Carbide Corporation, polyoxypropylene diamine such as Jeffamine D-2000 ® having a molecular weight of about 2000 available from Texaco Chemical Company and ethyoxylated Bisphenol A such as SYNFAC 8009 ® available from Milliken Chemical Company.

Examples of polyether polyols and conditions for chain extension are disclosed in U.S. Pat. No. 4,468,307.

Examples of polyester polyols for chain extension are disclosed in Marchetti et al U.S. Pat. No. 4,148,772 issued Apr. 10, 1979.

Typical reaction conditions used to form the epoxy resin are 100°–150° C. for about 0.5–2.0 hours and to chain extend the epoxy resin are 150°–200° C. for about 0.5–2.0 hours.

The adduct of the epoxy resin is formed by reacting the epoxy resin with an amine and then the adduct is neutralized with an acid to form an aqueous emulsion, referred to a the principal emulsion. The principal emulsion also contains a crosslinking agent, preferably a blocked polyisocyanate.

Typical amines that are used to form the adduct are primary and secondary amines such as diethyl amine, methyl ethyl amine, methyl ethanol amine, ethyl ethanol amine, mono ethanol amine, ethyl amine, dimethyl amine, diethyl amine, propyl amine, dipropyl amine, isopropyl amine, diisopropyl amine, butyl amine, dibutyl amine and the like. Alkanol amines such as methyl ethanol amine are preferred.

Typical acids used to neutralize the epoxy-amine adduct to form water dispersible cationic groups are lactic acid, acetic acid, formic acid, sulfamic acid and the like.

Ketimines can also be used with the above amines. Ketimines are formed from ketones and primary amines. The water formed is removed, for example, by azeotropic distillation. Useful ketones include dialkyl, diaryl and alkylaryl ketones having 3–13 carbons atoms. Specific examples include acetone, methyl ethyl ketone, methyl n-butyl ketone, methyl isobutyl ketone, methyl isoamyl ketone, methyl aryl ketone, ethyl isoamyl ketone, ethyl amyl ketone, acetophenone, and benzophenone. Suitable diamines are ethylene diamine, 1,3-diamopropane, 1,4-diaminobutane, 1,6-diaminohexane, 4,9-dioxadodecone, 1,12-diamine and the like. One typically useful ketimine is diketimine which is the kerimine of diethylene triamine and methyl isobutyl ketone.

Preferred polyisocyanate crosslinkers that are used are well known in the prior art. These are aliphatic, cycloaliphatic and aromatic isocyanates such as hexamethylene diisocyanate, cyclohexamethylene diisocyanate, toluene diisocyanate, methylene diphenyl diisocyanate and the like. These isocyanates are pre-reacted with a blocking agent such as oximes, alcohols, or caprolactams which block the isocyanate functionality, i.e., the crosslinking functionality. One preferred mixture of blocking agents is methanol, ethanol and diethylene gylcol monobutyl ether. Upon heating the blocking agents separate, thereby providing a reactive isocyanate group and crosslinking occurs. Isocyanate crosslinkers and blocking agents are well known in the prior art and also are disclosed in the aforementioned U.S. Pat. No. 4,419,467.

The binder of the electrocoating composition typically contains about 40–60% by weight of the epoxy amine adduct and 60–40% of the blocked isocyanate and are the principal resinous ingredients in the electrocoating composition.

Besides the binder resin described above, the electrocoating composition usually contains pigment which is incorporated into the composition in the form of a pigment paste. The pigment paste is prepared by grinding or dispersing a pigment into a grinding vehicle and optional ingredients such as wetting agents, surfactants, and defoamers. Any of the pigment grinding vehicles that are well known in the art can be used or the anticrater agent of this invention can be used. After grinding, the particle size of the pigment should be as small as practical, generally, the particle size is about 6–8 using a Hegman grinding gauge.

Pigments which can be used in this invention include titanium dioxide, basic lead silicate, strontium chromate, carbon black, iron oxide, zinc hydroxy phosphite, clay and the like. Pigments with high surface areas and oil absorbencies should be used judiciously because these can have an undesirable affect on coalescence and flow of the electrodeposited coating.

The pigment to binder weight ratio is also important and should be preferably less than 0.5:1, more preferably less than 0.4:1, and usually about 0.2 to 0.4:1. Higher pigment to binder weight ratios have been 2o found to adversely affect coalescence and flow.

The electrocoating composition of the invention can contain optional ingredients such as wetting agents, surfactants, defoamers and the like. Examples of surfactants and wetting agents include alkyl imidazolines such as those available from Ciba-Geigy Industrial Chemicals as "Amine C", acetylenic alcohols available from Air Products and Chemicals as "Surfynol 104". These optional ingredients, when present, constitute from about 0.1 to 20 percent by weight of the binder of the composition.

Optionally, plasticizers can be used to promote flow. Examples of useful plasticizers are high boiling water immiscible materials such as ethylene or propylene oxide adducts of nonyl phenols or bisphenol A. Plasticizers are usually used at levels of about 0.1 to 15 percent by weight of the binder of the composition.

The electrocoating composition of this invention is an aqueous dispersion. The term "dispersion" as used within the context of this invention is believed to be a two-phase translucent or opaque aqueous resinous binder system in which the binder is in the dispersed phase and water the continuous phase. The average particle size diameter of the binder phase is about 0.1 to 10 microns, preferably, less than 5 microns. The concentrations of the binder in the aqueous medium in general is not critical, but ordinarily the major portion of the aqueous dispersion is water. The aqueous dispersion usually contains from about 3 to 50 percent preferably 5 to 40 percent by weight binder solids. Aqueous binder concentrates which are to be further diluted with water when added to an electrocoating bath, generally have a range of binder solids of 10 to 30 percent weight.

The following example illustrates the invention. All parts and percentages are on a weight basis unless otherwise indicated.

EXAMPLE

Preparation of Pyrogallol Extended Polyepoxide Emulsion I

The following ingredients were charged into a suitable reaction vessel equipped with a stirrer and a heating source: 827 parts Epon 828 ® (diglycidyl ether of bisphenol A having an equivalent weight of 188), 37 parts of pyrogallol, 1 part of ethyltriphenyl phosphonium iodide, and 35 parts of xylene. The resulting mixture was heated to 177° C. under a blanket of nitrogen and held at this temperature for 1 hour. 292 parts of gylcidyl ether of ethoxylated bisphenol A having an epoxy equivalent weight of 365, 365 parts of bisphenol A and 1 part of ethyltriphenyl phosphonium iodide were added. The mixture was heated to 177° C. and held at this temperature for 1 hour. 1100 parts of a blocked isocyanate crosslinker solution (70% solids blocked isocyanate blocked with methanol, ethanol and diethylene glycol monobutyl ether in a 1:1:1.32 equivalent ratio where the isocyanate is Isonate 2181 ® (a modified methylene diphenyl diisocyanate) and 120 parts of diethanol amine were added. The mixture was held at 202° C. for one hour. The resulting resin was emulsified by adding 85 parts of an 88% lactic acid solution and 4177 parts of deionized water. The resulting emulsion was stripped to remove organic solvent to give and emulsion having a solids content of 35%. The emulsion had a particle size of 250 A (Angstroms).

Preparation of Control Polyepoxide Emulsion II

The following ingredients were charged into a suitable reaction vessel equipped as above: 827 parts Epon 828 ® (diglycidyl ether of bisphenol A having an equivalent weight of 188), 292 parts of gylcidyl ether of ethoxylated bisphenol A having an epoxy equivalent weight of 365, 456 parts of bisphenol A and 1 part of ethyltriphenyl phosphonium iodide were added. The mixture was heated to 177° C. under a blanket of nitrogen and held at this temperature for 1 hour. 1140 parts of a blocked isocyanate crosslinker solution (described above) and 120 parts of diethanol amine were added. The mixture was held at 202° C. for one hour. The resulting resin was emulsified by adding 85 parts of an 88% lactic acid solution and 4115 parts of deionized water. The resulting emulsion was stripped to remove organic solvent to give and emulsion having a solids content of 35%. The emulsion had a particle size of 925 A (Angstrom).

Preparation of Flex Emulsion Additive

The following ingredients were charged into a suitable reaction vessel under a blanket of nitrogen: 2322 parts of Jeffamine D-2000 ® (polyoxypropylene diamine having a weight average molecular weight of 1992) and heated to 90° C. followed by the addition of 859 parts of a solution of Epon 1001 ® (polyglycidyl ether of bisphenol A having an epoxy equivalent of 500) in 345 parts of 2-butoxyethanol. The reaction mixture was dispersed by adding 68 parts of acetic acid and 5354 parts water.

Preparation of Quaternizing Agent

A quaternizing agent was prepared by adding 87 parts dimethylethanolamine to 320 parts ethylhexanol half-capped toluene diisocyanate in the reaction vessel at room temperature. An exothermic reaction occurred and the reaction mixture was stirred for one hour at 80° C. 118 parts aqueous lactic acid solution (75% nonvolatile) was then added followed by the addition of 39 parts 2-butoxyethanol. The reaction mixture was held for about one hour at 65° C. with constant stirring to form the quaternizing agent.

Preparation of Pigment Grinding Vehicle

The pigment grinding vehicle was prepared by charging 710 parts Epon 829 ® (diglycidyl ether of bisphenol A having an epoxide equivalent weight of 193–203) and 290 parts bisphenol A into a suitable vessel under nitrogen blanket and heated to 150°–160° C. to initiate an exothermic reaction. The exothermic reaction was continued for about one hour at 150°–160° C. The reaction mixture was then cooled to 120° C. and 496 parts of 2-ethylhexanol half-capped toluene diisocyanate was added. The temperature of the reaction mixture was held at 110°–120° C. for one hour, followed by the addition of 1095 parts of 2-butoxyethanol, the reaction mixture was then cooled to 85°–90° C., and then 71 parts of deionized water was added followed by the addition of 496 parts quaternizing agent (prepared above). The temperature of the reaction mixture was held at 85°–90° C. until an acid value of about 1 was obtained.

Preparation of Pigment Paste

|  | Parts by Weight |
|---|---|
| Pigment Grinding Vehicle (prepared above) | 203 |
| Deionized Water | 415 |
| Titanium Dioxide Pigment | 267 |
| Aluminum Silicate Pigment | 53 |
| Lead Silicate Pigment | 23 |
| Carbon Black Pigment | 8 |
| Dibutyl Tin Oxide | 31 |
| Total | 1000 |

The above ingredients were mixed until homogenous in a suitable mixing container. They were then dispersed in a sandmill until a Hegman reading of seven or greater is obtained. The nonvolatile of the paste is 50%.

Preparation of Electrocoating Baths I and II

|  | Parts by Weight | |
|---|---|---|
|  | Bath I | Bath II |
| Extended Polyepoxide Emulsion I (prepared above) | 3206 |  |
| Control Polyepoxide Emulsion II (prepared above) |  | 3206 |
| Flex Emulsion (prepared above) | 336 | 336 |
| SynFac 8334 (Styrenated ethoxylated phenol) | 59 | 59 |
| Pigment Paste (prepared above) | 838 | 838 |
| Deionized water | 4151 | 4151 |
| Total | 8590 | 8590 |

Electrocoating baths I and II were prepared by blending the above constituents together and each charged into a cathodic electrocoating tank and the throw power of each of the baths was measured. The throw power test that was used was a European Throw power test. The test is conducted on an assembly of two aligned 4×12 inch panels of phosphated cold rolled steel. The panels are separated by a ⅜ inch by 12 inch plastic shim that is 4 mm thick positioned along each 12 inch edge of the panels. The panels are taped together lengthwise along each 12 inch edge to form a watertight seal along the edge. The resulting assembly is immersed in the bath to a depth of 10 inches. The assemblies were cathodically electrocoated at a bath temperature of 30° C. for 2 minutes at 325 volts and for 2 minutes at 260 volts in baths I and II respectively. A 0.83 mil thick film was electrodeposited. The throw power was measured and is the distance the coating was deposited inside of the assembly. The throw power for Bath I (the invention) was 205 mm and the throw power for bath II (control) was 188 mm. The results show a significant increase in the throw power of Bath I (the invention which contains a multihydric phenol) in comparison Bath II (control which represents a conventional electrocoating composition).

We claim:

1. An improved aqueous cathodic electrocoating composition, comprising an aqueous carrier having dispersed therein a film forming binder comprising an epoxy resin-amine adduct and a blocked polyisocyanate crosslinking agent; wherein the improvement consists essentially of using as said epoxy resin an epoxy resin which is the reaction product of a diglycidyl ether of a dihydric phenol and a multihydric phenol having at least three reactive hydroxyl groups; wherein the molar ratio of multihydric phenol to dihydric phenol is about 0.005/1 to about 1/1 to provide an electrocoating composition having improved throw power; wherein the multihydric phenol has the following structural formula:

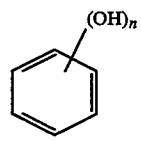

where n is 3–5.

2. The improved cathodic electrocoating composition of claim 1 in which the multihydric phenol is selected from the group consisting of 1,2,3-trihydroxybenzene, 1,3,5 trihydroxy benzene and 1,2,4,5-tetrahydroxybenzene.

3. The improved cathodic electrocoating composition of claim 1 in which the epoxy resin is extended with a chain extender which is a dihydric phenol, a polyether polyol or a polyester polyol.

4. The improved electrocoating composition of claim 3 in which the chain extender additionally includes said multihydric phenol having at least 3 reactive hydroxyl groups.

5. An improved aqueous cathodic electrocoating composition, comprising an aqueous carrier having dispersed therein a film forming binder comprising an epoxy resin-amine adduct and a blocked polyisocyanate crosslinking agent; wherein the improvement consists essentially of using as said epoxy resin an epoxy resin which is the reaction product of a diglycidyl ether of a dihydric phenol, a chain extender which is a dihydric phenol, a polyether glycol or a polyester glycol and a multihydric phenol having at least three reactive hydroxyl groups; wherein the molar ratio of multihydric phenol to chain extender is about 0.005/1 to about 1/1 to provide an electrocoating composition having improved throw power;

wherein the multihydric phenol has the following structural formula:

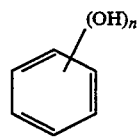

where n is 3–5.

6. In a method of preparing a cathodic electrocoating composition and an article made therefrom comprising the following steps in any workable order:
(a) preparing an epoxy resin-amine adduct;
(b) preparing a blocked polyisocyanate crosslinking agent;
(c) blending the epoxy-amine adduct with the blocked polyisocyanate crosslinking agent;
(d) neutralizing the epoxy-amine adduct with an organic acid to form an emulsion;
(e) blending the emulsion with a pigment paste;
wherein the improvement comprises using an epoxy resin which is the reaction product of a diglycidyl ether of a dihydric phenol and a multihydric phenol having at least three reactive hydroxy groups wherein the molar ratio of multhydric phenol to dihydric phenol is about 0.005/1 to about 1/1 in forming said adduct to provide an electrocoating composition having improved throwing power; wherein the multihydric phenol has the following structural formula:

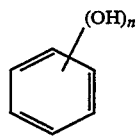

where n is 3–5, said composition being subseqently applied to a substrate to form said article.

7. The improved method of claim 6 in which the multihydric phenol is selected from the group consisting of 1,2,3-trihydroxybenzene, 1,3,5 trihydroxy benzene and 1,2,4,5-tetrahydroxybenzene.

* * * * *